US012756508B2

(12) United States Patent
Liu et al.

(10) Patent No.: US 12,756,508 B2
(45) Date of Patent: Oct. 6, 2026

(54) INTER-CELL MULTI-TRANSMISSION RECEPTION POINT (TRP) OPERATION

(71) Applicant: Lenovo (Beijing) Limited, Beijing (CN)

(72) Inventors: Bingchao Liu, Beijing (CN); Chenxi Zhu, Fairfax, VA (US); Wei Ling, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 409 days.

(21) Appl. No.: 18/271,745

(22) PCT Filed: Jan. 12, 2021

(86) PCT No.: PCT/CN2021/071164

§ 371 (c)(1),
(2) Date: Jul. 11, 2023

(87) PCT Pub. No.: WO2022/150938

PCT Pub. Date: Jul. 21, 2022

(65) Prior Publication Data

US 2024/0063959 A1 Feb. 22, 2024

(51) Int. Cl.
*H04L 5/00* (2006.01)
*H04B 7/06* (2006.01)
*H04W 72/21* (2023.01)

(52) U.S. Cl.
CPC ....... *H04L 5/0035* (2013.01); *H04B 7/06968* (2023.05); *H04L 5/0051* (2013.01); *H04L 5/0053* (2013.01); *H04W 72/21* (2023.01)

(58) Field of Classification Search
CPC ... H04L 5/0035; H04L 5/0051; H04L 5/0053; H04W 72/21; H04B 7/06968
See application file for complete search history.

(56) References Cited

U.S. PATENT DOCUMENTS

2020/0221405 A1* 7/2020 Zarifi .................. H04W 52/242
2023/0239823 A1* 7/2023 Liu ................... H04W 56/0045
370/350

FOREIGN PATENT DOCUMENTS

CN 111294822 A 6/2020
CN 112119597 A 12/2020
EP 4203337 A1 6/2023
(Continued)

OTHER PUBLICATIONS

3GPP TSG RAN WG1#103-e R1-2007765; Discussion on Multi-TRP Inter-cell Operation (Year: 2020).*
(Continued)

*Primary Examiner* — Duc C Ho
(74) *Attorney, Agent, or Firm* — FIG. 1 Patents

(57) ABSTRACT

Methods and apparatuses for inter-cell multi-TRP operation are disclosed. In one embodiment, a method comprises receiving a configuration of different CORESETPoolIndex values for different CORESETs, wherein, CORESETPoolIndex=0 is associated with a PCID of a serving cell and the higher layer parameter CORESETPoolIndex=1 is associated with a PCID of a non-serving cell that is different from the PCID of the serving cell; and receiving a configuration of a SSB from the non-serving cell configured as a RS to the signal associated with CORESETPoolIndex=1.

20 Claims, 4 Drawing Sheets

(56) References Cited

FOREIGN PATENT DOCUMENTS

| | | | | |
|---|---|---|---|---|
| WO | 2017196722 | A1 | 11/2017 | |
| WO | WO-2020092468 | A1 * | 5/2020 | ........... H04B 7/0632 |
| WO | 2020215108 | A2 | 10/2020 | |

OTHER PUBLICATIONS

"Foreign Office Action", EP Application No. 21918157.5, 6 pages, Apr. 7, 2025.

21918157.5 , "Extended European Search Report", EP Application No. 21918157.5, Sep. 26, 2024, 12 pages.

Moderator (Vivo) , "FL summary on inter-cell MTRP operation", 3GPP TSG RAN WG1 #103-e, R1-2009415, e-Meeting, Oct. 2020, 21 pages.

PCT/CN2021/071164 , "International Preliminary Report on Patentability", PCT Application No. PCT/CN2021/071164, Jul. 27, 2023, 5 pages.

PCT/CN2021/071164 , "International Search Report and Written Opinion", PCT Application No. PCT/CN2021/071164, Sep. 28, 2021, 6 pages.

ZTE , "Discussion on Multi-TRP inter-cell operation", 3GPP TSG RAN WG1 #103-e, R1-2007765, e-Meeting [retrieved Jun. 7, 2023]. Retrieved from the Internet <https://www.3gpp.org/ftp/TSG_RAN/WG1_RL1/TSGR1_103-e/Docs>., Oct. 2020, 4 Pages.

* cited by examiner

INTER-CELL MULTI-TRANSMISSION RECEPTION POINT (TRP) OPERATION

FIELD

The subject matter disclosed herein generally relates to wireless communications, and more particularly relates to methods and apparatuses for inter-cell multi-TRP operation.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), Transmitter (TX), Receiver (RX), Transmission Configuration Indication (TCI), Downlink Control Information (DCI), multiple DCI (multi-DCI), transmission reception point (TRP), multiple TRP (multi-TRP or M-TRP), reference signal (RS), Demodulation RS (DM-RS), Physical Downlink Control Channel (PDCCH), Physical Downlink Shared Channel (PDSCH), channel state information reference signal (CSI-RS), Remote Radio Head (RRH), physical cell ID (PCID), quasi co-location (QCL), Synchronization Signal Block (SSB), Synchronization Signal (SS), Physical Broadcast Channel (PBCH), Tracking Reference Signal (TRS), non zero power (NZP), System Frame Number (SFN), Least Significant Bit (LSB), Energy per resource element (EPRE), measurement object (MO), SS/PBCH block measurement timing configuration (SMTC), pathloss Reference RS (PL-RS), Physical Uplink Shared Channel (PUSCH), Physical Uplink Control Channel (PUCCH), Sounding Reference Signal (SRS), control resource set (CORESET), band width part (BWP), subcarrier space (SCS).

In NR Release 15 and Release 16, M (up to 128, which depends on UE capability) TCI states can be configured for a UE in a carrier (i.e. in a cell) by RRC signaling. The TCI state is configured by the following RRC signaling:

TABLE 1

RRC configuration for TCI state in NR Release 15 and Release 16

TCI state
The IE TCI state associates one or two DL reference signals with a corresponding quasi-colocation (QCL) type.

TCI state information element

```
TCI state ::=          SEQUENCE {
  TCI stateId            TCI stateId,
  qcl-Type1              QCL-Info,
  qcl-Type2              QCL-Info
  ...
}
QCL-Info ::=           SEQUENCE {
  cell                   ServCellIndex
  bwp-Id                 BWP-Id
  referenceSignal        CHOICE {
    csi-rs                 NZP-CSI-RS-ResourceId,
```

TABLE 1-continued

RRC configuration for TCI state in NR Release 15 and Release 16

```
    ssb                    SSB-Index
  },
  qcl-Type               ENUMERATED {typeA, typeB, typeC,
typeD},
  ...
}
```

Each TCI state contains parameters for configuring a quasi co-location (QCL) relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

Multi-DCI based multi-TRP (e.g. two TRPs) DL operation is supported in NR Release 16, where each TRP can send a PDCCH transmission scheduling a PDSCH transmission from this TRP.

One typical scenario for the deployment of multi-DCI based multi-TRP is illustrated in FIG. 1. The serving cell with a dedicated physical cell ID (PCID) is covered by multiple TRPs (e.g. two TRPs), i.e., a high-power macro gNB (i.e. TRP #1) and a lower power RRH (i.e. TRP #2), where the RRH is connected with the gNB via optical fiber. A UE accessing the serving cell can be served by both gNB and RRH in multi-DCI based multi-TRP mode. Since the two TRPs (i.e. the gNB and the RRH) are within one serving cell, the deployment illustrated in FIG. 1 is referred to as "intra-cell multi-TRP deployment".

In NR Release 15 and Release 16 QCL framework, TRS is used for the UE to obtain the QCL-TypeA parameters including Doppler shift, Doppler spread, average delay and delay spread of the wireless channel for the channel estimation based on the DM-RS of PDCCH and PDSCH. It means that the UE may assume that the DM-RS ports of PDCCH and PDSCH are quasi co-located (QCLed) with TRS with respect to QCL-TypeA, i.e. the DM-RS ports of PDCCH and PDSCH can get the Doppler shift, Doppler spread, average delay, delay spread from the estimation of the TRS. Incidentally, TRS is a NZP CSI-RS configured with higher layer parameter trs-info.

In addition, the UE should obtain the source QCL-TypeC parameters including Doppler shift and average delay using SSB (SS/PBCH block) before receiving the TRS. It means that the UE may assume that the TRS is QCLed with SSB with respect to QCL-TypeC, i.e. the UE can get the initial Doppler shift and average delay of the wireless channel from the estimation of the SSB for the reception of TRS.

In the intra-cell multi-TRP scenario illustrated in FIG. 1, the SSB of the serving cell associated with the same PCID can be transmitted by both gNB and RRH. The UE can obtain the source QCL-TypeC parameters for the TRS transmitted from gNB and RRH by using the SSB from the same serving cell.

Another typical deployment of multi-DCI based multi-TRP is inter-cell multi-TRP scenario illustrated in FIG. 2.

A UE is located in the cell edge of Cell #1 as well as Cell #2. The UE is served by TRP #1 and TRP #2 in multi-DCI based multi-TRP mode. Cell #1 is covered by its SSBs (SSB set #1) associated with a PCID (e.g. PCID #1) transmitted from TRP #1. Cell #2 is covered by its SSBs (SSB set #2) associated with another PCID (e.g. PCID #2) transmitted from TRP #2. However, the UE only access Cell #1 and does not access Cell #2. It means that the UE only obtains the system information from Cell #1 and treat Cell #2 as a TRP, and that Cell #1 is the serving cell for the UE while Cell #2 is a non-serving cell for the UE.

The UE shall use the SSB signals transmitted from TRP #2 to obtain the source QCL-TypeC parameter for the reception of TRS and DM-RS transmitted from TRP #2.

However, in NR Release 15 and Release 16 QCL framework (i.e. RRC configuration for TCI state in NR Release 15 and Release 16 as shown in Table 1), only the CSI-RS and SSB from the same serving cell can be set as the RS for QCL indication. For example, the CSI-RS or SSB configured in the QCL-Info for a TCI-state should be in the same serving cell. Based on the RRC configuration for TCI state in NR Release 15 and Release 16, it is not possible to configure a SSB from a non-serving cell in the QCL-Info for a TCI-state for a serving cell.

Take the scenario provided in FIG. 2 as an example, TRP #1 and TRP #2 are two different gNBs (gNB #1 and gNB #2) configured with different PCIDs (PCID #1 and PCID #2). SSB set #1 is transmitted from TRP #1 and is associated with PCID #1, and SSB set #2 is transmitted from TRP #2 and is associated with PCID #2. The UE only accesses the cell of gNB #1, so the UE can obtain the PCID #1 and SSB set #1 through the random access procedure. However, the UE may not access the cell of gNB #2, and accordingly the UE cannot obtain the PCID #2 and SSB set #2 without random access.

Enhancements are required to support the inter-cell multi-TRP operation. This invention discloses methods and apparatuses for inter-cell multi-TRP operation.

BRIEF SUMMARY

Methods and apparatuses for inter-cell multi-TRP operation are disclosed.

In one embodiment, a method comprises receiving a configuration of different CORESETPoolIndex values for different CORESETs, wherein, CORESETPoolIndex=0 is associated with a PCID of a serving cell and the higher layer parameter CORESETPoolIndex=1 is associated with a PCID of a non-serving cell that is different from the PCID of the serving cell; and receiving a configuration of a SSB from the non-serving cell configured as a RS to the signal associated with CORESETPoolIndex=1.

In one embodiment, the TRS contained in the TCI state activated for the CORESET configured with CORESETPoolIndex=1 is QCLed with a SSB from the non-serving cell. In addition, the TRS contained in the activated TCI state associated with CORESETPoolIndex=1 used for PDSCH is QCLed with a SSB from the non-serving cell.

In another embodiment, the SSB configured for the spatial relation for PUCCH and SRS associated with CORESETPoolIndex=1 is associated with the PCID of the non-serving cell. In addition, the SSB configured for the PL-RS for PUSCH, PUCCH and SRS associated with CORESETPoolIndex=1 is associated with the PCID of the non-serving cell.

In some embodiment, the CSI-RS configured for the spatial relation for PUCCH and SRS associated with CORESETPoolIndex=1 is QCLed with a SSB from the non-serving cell. In addition, the CSI-RS configured for the PL-RS for PUSCH, PUCCH and SRS associated with CORESETPoolIndex=1 is QCLed with a SSB from the non-serving cell.

In some embodiment, the PCID of the non-serving cell is associated with a neighboring cell configured in the measurement objects for the UE. The SSB indices associated with the PCID of the non-serving cell are within the SMTC configured for the neighboring cell associated with the PCID.

In another embodiment, a remote unit comprises a receiver that receives a configuration of different CORESETPoolIndex values for different CORESETs, wherein, CORESETPoolIndex=0 is associated with a PCID of a serving cell and the higher layer parameter CORESETPoolIndex=1 is associated with a PCID of a non-serving cell that is different from the PCID of the serving cell, and further receives a configuration of a SSB from the non-serving cell configured as a RS to the signal associated with CORESETPoolIndex=1.

In one embodiment, a method comprises transmitting a configuration of different CORESETPoolIndex values for different CORESETs, wherein, CORESETPoolIndex=0 is associated with a PCID of a serving cell and the higher layer parameter CORESETPoolIndex=1 is associated with a PCID of a non-serving cell that is different from the PCID of the serving cell; and transmitting a configuration of a SSB from the non-serving cell configured as a RS to the signal associated with CORESETPoolIndex=1.

In yet another embodiment, a base unit comprises a receiver that receives a configuration of different CORESETPoolIndex values for different CORESETs, wherein, CORESETPoolIndex=0 is associated with a PCID of a serving cell and the higher layer parameter CORESETPoolIndex=1 is associated with a PCID of a non-serving cell that is different from the PCID of the serving cell, and further receives a configuration of a SSB from the non-serving cell configured as a RS to the signal associated with CORESETPoolIndex=1.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
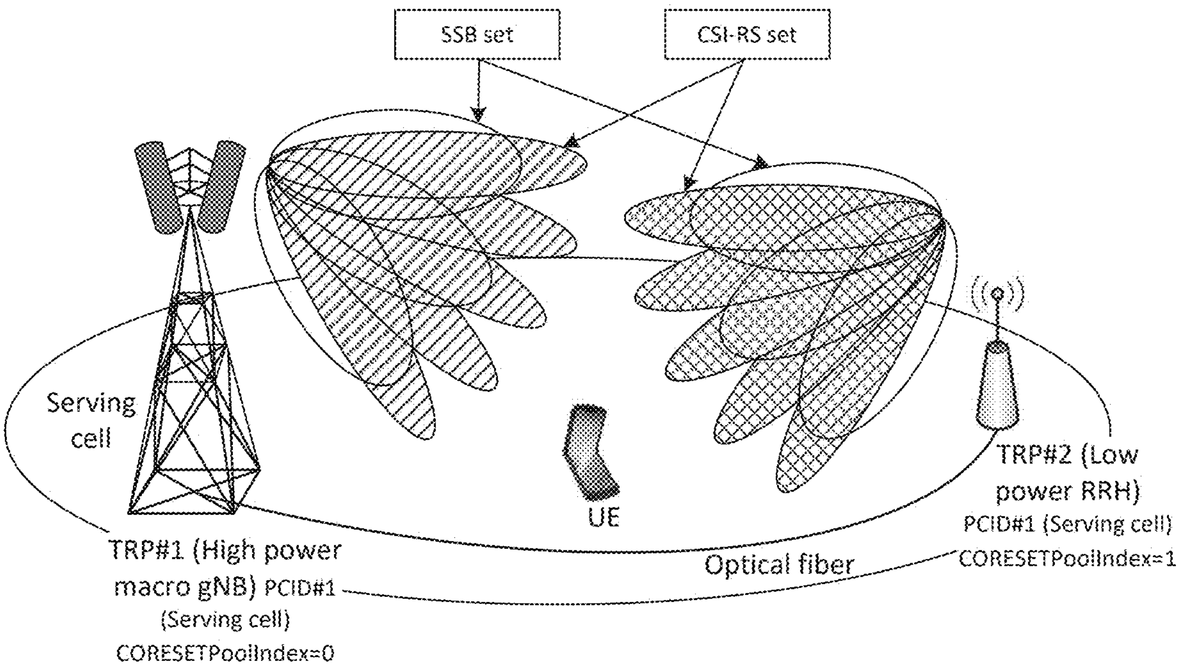
Figure 1 (Prior Art)
FIG. 1 illustrates intra-cell multi-TRP deployment.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

Figure 2:
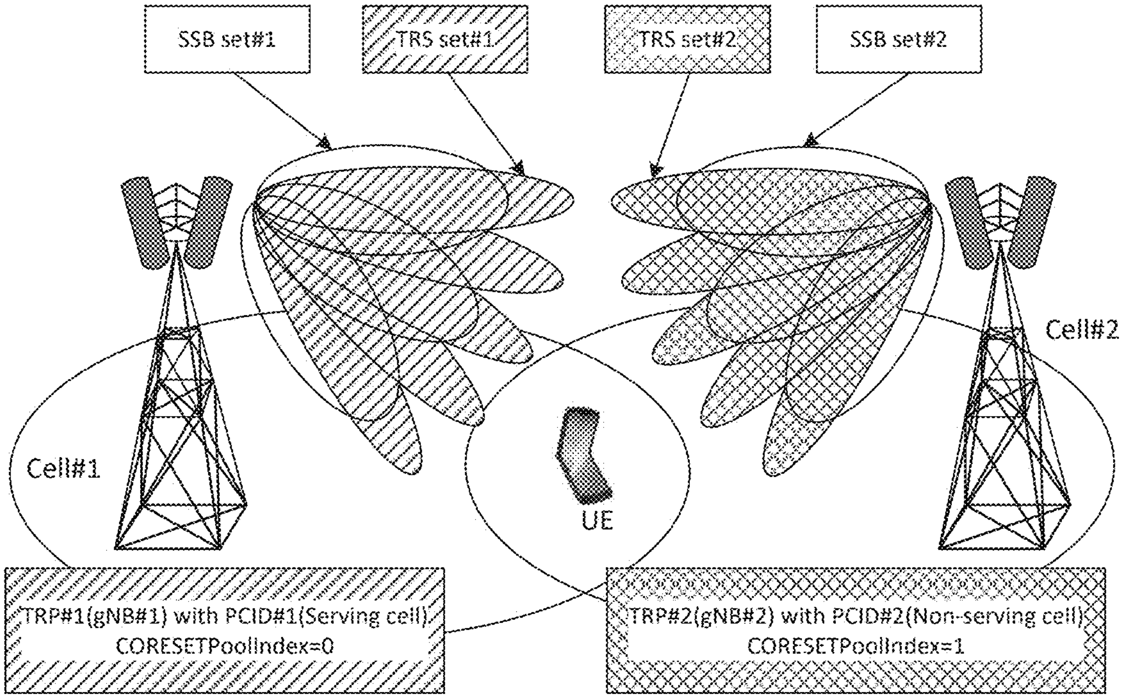
Figure 2 (Prior Art)
FIG. 2 illustrates inter-cell multi-TRP deployment.

In FIG. 2, the UE is served by two gNBs (gNB #1 and gNB #2) from two cells in multi-DCI based multi-TRP operation. The UE expects the QCL chains configurations for PDSCH and PDCCH reception as illustrated in FIG. 3.

Figure 3:
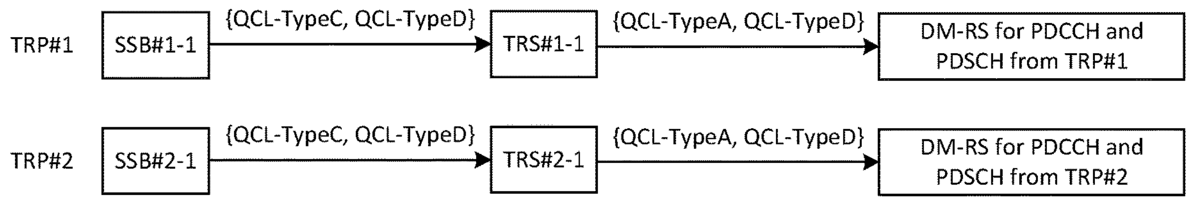
FIG. 3 illustrates an example of QCL chain for inter-cell multi-TRP operation.

As illustrated in FIG. 3, for the PDSCH and PDCCH transmitted from TRP #1, UE expects that the network configures SSB (e.g., SSB #1-1) from SSB set #1 as the source QCL-TypeC and QCL-TypeD RS for the TRS (e.g., TRS #1-1) from TRS set #1 used for the reception of DM-RS for PDSCH and PDCCH transmitted from TRP #1 (i.e. TRS #1-1 is the source QCL-TypeA and QCL-TypeD RS for the DM-RS for one PDSCH or one PDCCH transmitted from TRP #1). For PDSCH and PDCCH transmitted from TRP #2, the UE expects that the network configures SSB (e.g., SSB #2-1) from SSB set #2 as the source QCL-TypeC and QCL-TypeD RS for the TRS (e.g., TRS #2-1) from TRS set #2 used for the reception of DM-RS for PDSCH and PDCCH transmitted from TRP #2 (i.e. TRS #2-1 is the source QCL-TypeA and QCL-TypeD RS for the DM-RS for one PDSCH or PDCCH transmitted from TRP #2).

In order to support the QCL chain illustrated in FIG. 3, an updated RRC configuration of TCI state shown in Table 2 can be used. It can be seen from Table 2 that both SSB from serving cell, i.e. ssb-IndexServing, that can be set as SSB-Index, and SSB from non-serving cell, i.e. ssb-Ncell, that can be set as SSB-InfoNcell-r16, can be set as the reference signal of a certain QCL-Info.

TABLE 2

RRC configuration for updated TCI state

```
TCI-State ::=                SEQUENCE {
   tci-StateId                 TCI-StateId,
   qcl-Type1                   QCL-Info,
   qcl-Type2                   QCL-Info
   ...
}
QCL-Info ::=                 SEQUENCE {
   cell                        ServCellIndex
   bwp-Id                      BWP-Id
   referenceSignal             CHOICE {
      csi-rs                     NZP-CSI-RS-ResourceId,
      ssb-IndexServing           SSB-Index
      ssb-Ncell                  SSB-InfoNcell-r16
   },
   qcl-Type                    ENUMERATED {typeA, typeB,
typeC, typeD},
   ...
}
```

Compared with Table 1, the “ssb-Ncell” in the “referenceSignal” is newly added in Table 2. The “ssb-Ncell” can be set as “SSB-InfoNcell-r16”. The “SSB-InfoNcell-r16” contains some necessary information for the UE to obtain the correct SSB indices from a non-serving cell without decoding of system information and without random access procedure.

The configuration of the “SSB-InfoNcell-r16” is shown in Table 3.

TABLE 3

RRC configuration for non-serving cell’s information

```
SSB-InfoNcell-r16 ::=            SEQUENCE {
   physicalCellId-r16              PhysCellId,
   ssb-IndexNcell-r16              SSB-Index
   ssb-Configuration-r16           SSB-Configuration-r16
}
SSB-Configuration-r16 ::=        SEQUENCE {
   ssb-Freq-r16                    ARFCN-ValueNR,
   halfFrameIndex-r16              ENUMERATED {zero, one},
   ssbSubcarrierSpacing-r16        SubcarrierSpacing,
   ssb-Periodicity-r16             ENUMERATED { ms5, ms10,
ms20, ms40, ms80, ms160, spare2, spare1 }
   sfn0-Offset-r16                 SEQUENCE {
      sfn-Offset-r16                 INTEGER (0..1023),
      integerSubframeOffset-r16      INTEGER (0..9)
   }
   sfn-SSB-Offset-r16              INTEGER (0..15),
   Ss-PBCH-BlockPower-r16          INTEGER (−60..50)
}
```

When a non-serving cell's SSB is configured as the RS in QCL-Info, a PCID of the non-serving cell is associated. In addition, some additional information are provided for the UE to get the correct SSB information. The additional information may include the following:

ssb-Freq-r16, that indicates the frequency of the SSB.

halfFrameIndex-r16, that indicates whether SSB is in the first half or the second half of the frame. Value zero (0) indicates the first half and value one (1) indicates the second half.

ssbSubcarrierSpacing-r16, that indicates the subcarrier spacing of SSB.

ssb-Periodicity-r16, that indicates the periodicity of the SSB. If this field is absent, the UE applies the value ms5, wherein ms5 means 5 milliseconds.

sfn0-Offset-r16, that indicates the time offset of the SFN0 slot 0 for the cell with respect to SFN0 slot 0 of serving cell.

sfn-Offset-r16, that indicates the 4 LSBs of the SFN of the cell in which SSB is transmitted.

integerSubframeOffset-r16, that indicates the subframe boundary offset of the cell in which SSB is transmitted.

sfn-SSB-Offset-r16, that indicates the offset between the SFN and SSB.

ssb-PBCH-BlockPower-r16, that indicates the average EPRE of the resources elements that carry secondary synchronization signals in dBm that the network used for SSB transmission.

According to the RRC signaling provided in Table 2 and Table 3, the UE can obtain the QCL-TypeC parameter for the wireless channel between the UE and the non-serving cell's TRP by using the SSB from the non-serving cell.

In multi-DCI based multi-TRP, different CORESETs are configured for different TRPs (e.g. two TRPs), where each CORESET identifies a set of time-frequency resources used for PDCCH transmission and each CORESET has a different ID. A higher layer parameter CORESETPoolIndex is configured for each CORESET for TRP differentiation. For example, the CORESET(s) configured with CORESETPoolIndex=0 is associated with TRP #1, and the CORESET(s) configured with CORESETPoolIndex=1 is associated with TRP #2.

In order to simplify the UE implementation complexity, some restrictions or assumptions can be preferably made by the UE. In particular, the UE may assume the following.

CORESETPoolIndex=0 is associated with the PCID of the serving cell and CORESETPoolIndex=1 is associated with another PCID different from the PCID the serving cell, e.g. the other PCID is a PCID of a non-serving cell.

The TRS contained in the TCI state activated for CORESET(s) associated with CORESETPoolIndex=0 is QCLed with a SSB from the serving cell with respect to QCL-TypeC and, if applicable, also with respect to QCL-TypeD, and the TRS contained in the TCI state activated for CORESET(s) associated with CORESETPoolIndex=1 is QCLed with a SSB from the non-serving cell with respect to QCL-TypeC and, if applicable, also with respect QCL-TypeD.

The TRS contained in the activated TCI states used for PDSCH associated with CORESETPoolIndex=0 is QCLed with a SSB from the serving cell with respect to QCL-TypeC and, if applicable, also with respect to QCL-TypeD, and the TRS contained in the activated TCI states associated with CORESETPoolIndex=1 is QCLed with a SSB from the serving cell with respect to QCL-TypeC and, if applicable, also with respect to QCL-TypeD.

The SSB resources of non-serving cells have the same center frequency and the same SCS as the SSBs of the serving cell.

The SSB of a non-serving cell is associated with a PCID different from the PCID of the serving cell.

The PCID of the non-serving cell is associated with a neighboring cell configured in the measurement objects for the UE. The UE is configured with multiple measurement objects (MOs) to support multi-cell mobility, where each MO can be configured with one or more non-serving cells, i.e., neighboring cell(s), for mobility measurement and mobility event assessment.

The indicated SSB index from the non-serving cell should be within the SMTC (SS/PBCH block measurement timing configuration) configured for the neighboring cell with the same PCID, because the UE assumes that the SSB(s) outside the configured SMTC are not transmitted by the cell.

For example, CORESET #1, CORESET #2, CORESET #3, CORESET #4, and CORESET #5 are configured in an active DL BWP, where, CORESETPoolIndex=0 is configured for CORESET #1, CORESET #2, and CORESET #3; and CORESETPoolIndex=1 is configured for CORESET #4, and CORESET #5. The UE may assume that CORESET #1, CORESET #2, and CORESET #3 are configured for TRP #1, and that CORESET #4, and CORESET #5 are configured for TRP #2. TRP #1 is associated with PCID #1 that is the physical cell ID of the serving cell, and TRP #2 is associated with PCID #2 that is the physical cell ID of a non-serving cell for the UE. The PCID #2 should be associated with a neighboring cell configured in the MO(s) (measurement objects) configured for the UE.

The UE expects that the TRSs contained in the TCI state(s) activated for CORESET #1, CORESET #2, and CORESET #3 are QCLed with SSBs associated with PCID #1, and that the TRSs contained in the TCI state(s) activated for CORESET #4, and CORESET #5 are QCLed with SSBs associated with PCID #2. The SSB indices configured for TRS in the TCI states activated for CORESET #4, and CORESET #5 should be within the SMTC configured for the neighboring cell associated with PCID #2.

Multi-DCI based multi-TRP UL transmission is also supported in NR Release 16. Each PUCCH resource may be associated with a CORESETPoolIndex value for TRP-specific PUCCH transmission. In the scenario provided in FIG. 2, the UL TX beam for PUSCH or PUCCH transmitted to TRP #2 can also be QCLed with a SSB from the non-serving cell (where TRP #2 is located). Therefore, the SSB from the non-serving cell, e.g. TRP #2 in FIG. 2, could be configured as the spatial relation and the PL-RS for the UL signal targeting TRP (e.g. TRP #2) associated with a PCID of the non-serving cell.

The RRC configuration for the spatial relation (spatialRelationInfo) and the PL-RS shown in Table 4 can be used, the configured parameters are defined in 3GPP NR TS38.331 V16.4.0.

TABLE 4

| RRC configuration for the spatial relation and PL-RS for PUCCH | |
|---|---|
| PUCCH-SpatialRelationInfo ::= | SEQUENCE { |
| pucch-SpatialRelationInfoId | PUCCH-SpatialRelationInfoId, |

TABLE 4-continued

RRC configuration for the spatial relation and PL-RS for PUCCH

```
    servingCellId                      ServCellIndex
    referenceSignal                    CHOICE {
       ssb-IndexServing                     SSB-Index,
       ssb-Ncell-r16                        SSB-InfoNcell-r16
       csi-RS-Index                         NZP-CSI-RS-ResourceId,
       srs                                  PUCCH-SRS
    },
    pucch-PathlossReferenceRS-Id       PUCCH-PathlossReferenceRS-Id,
    p0-PUCCH-Id                        P0-PUCCH-Id,
    closedLoopIndex                    ENUMERATED { i0, i1 }
 }
 PUCCH-PathlossReferenceRS ::=      SEQUENCE {
    pucch-PathlossReferenceRS-Id          PUCCH-PathlossReferenceRS-Id,
    referenceSignal                       CHOICE {
       ssb-IndexServing                        SSB-Index
       ssb-Ncell-r16                           SSB-InfoNcell-r16
       csi-RS-Index                            NZP-CSI-RS-ResourceId
    }
 }
```

Note that the detail configuration for ssb-Ncell-r16 is provided in Table 3.

In order to simplify the UE implementation complexity, some restrictions or assumptions can be preferably made by the UE. In particular, the UE may assume the following.

The UE assumes that SSBs configured in the spatialRelationInfo for PUCCH and SRS associated with CORESETPoolIndex=1 are associated with a PCID different from the PCID of the serving cell for CORESETPoolIndex=0.

The UE assumes that SSB indices configured in the PL-RS for the PUSCH, PUCCH and SRS associated with CORESETPoolIndex=1 are associated with a PCID different from the PCID of the serving cell for CORESETPoolIndex=0.

If a CSI-RS resource is configured as the spatialRelationInfo for PUCCH and SRS associated with CORESETPoolIndex=1, the UE expects the CSI-RS resource is QCLed with a SSB associated with a PCID different from the PCID of the serving cell for CORESETPoolIndex=0.

If a CSI-RS resource is configured for the PL-RS for the PUSCH, PUCCH and SRS associated with CORESETPoolIndex=1, the UE expects the CSI-RS resource is QCLed with a SSB associated with a PCID different from the PCID of the serving cell for CORESETPoolIndex=0.

In addition, similar with the DL transmission, the UE expects that the PCID of the non-serving cell is associated with a neighboring cell configured in the measurement objects for mobility, and that the indicated SSB index from the non-serving cell should be within the SMTC (SS/PBCH block measurement timing configuration) configured for the neighboring cell with the same PCID.

Figure 4:
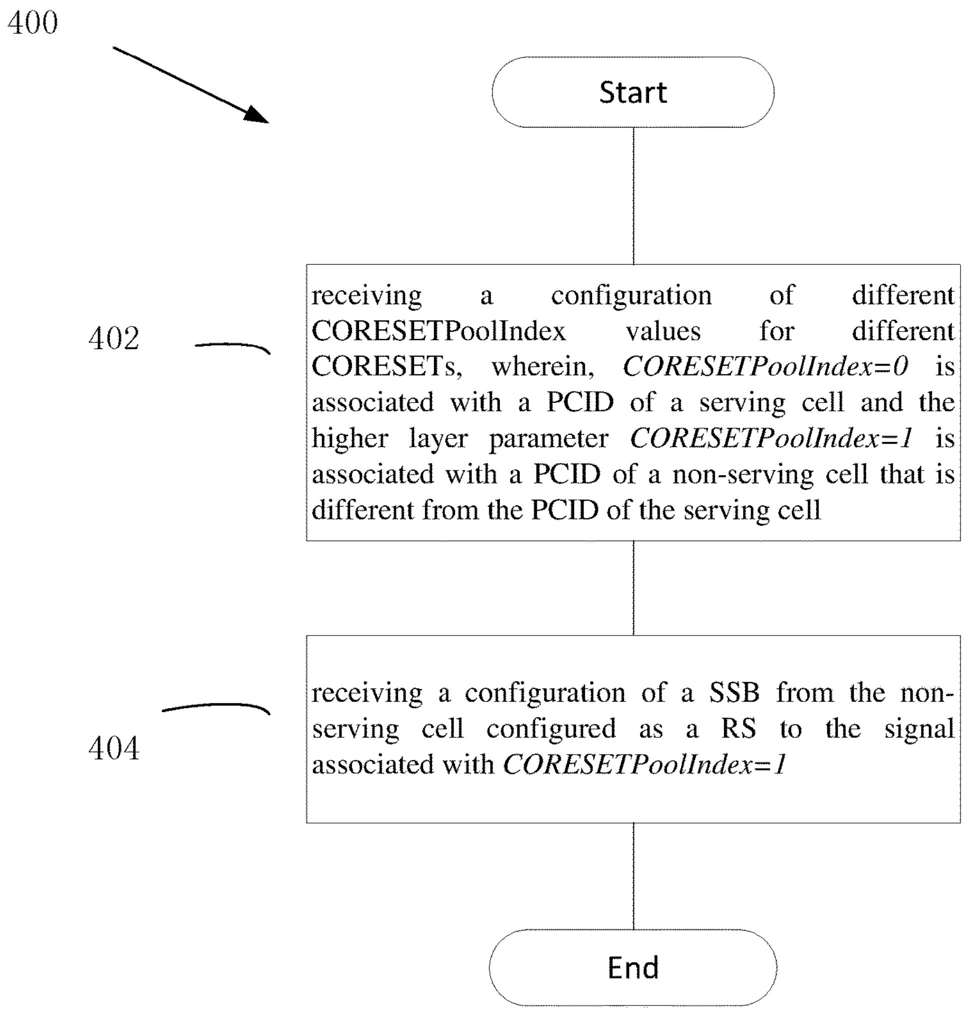
FIG. 4 is a schematic flow chart diagram illustrating an embodiment of a method.

FIG. 4 is a schematic flow chart diagram illustrating an embodiment of a method 400 according to the present application. In some embodiments, the method 400 is performed by an apparatus, such as a remote unit. In certain embodiments, the method 400 may be performed by a processor executing program code, for example, a microcontroller, a microprocessor, a CPU, a GPU, an auxiliary processing unit, a FPGA, or the like.

The method 400 may include 402 receiving a configuration of different CORESETPoolIndex values for different CORESETs, wherein, CORESETPoolIndex=0 is associated with a PCID of a serving cell and the higher layer parameter CORESETPoolIndex=1 is associated with a PCID of a non-serving cell that is different from the PCID of the serving cell; and 404 receiving a configuration of a SSB from the non-serving cell configured as a RS to the signal associated with CORESETPoolIndex=1.

Preferably, the TRS contained in the TCI state activated for the CORESET configured with CORESETPoolIndex=1 is QCLed with a SSB from the non-serving cell.

Preferably, the TRS contained in the activated TCI state associated with CORESETPoolIndex=1 used for PDSCH is QCLed with a SSB from the non-serving cell.

Preferably, the SSB configured for the spatial relation for PUCCH and SRS associated with CORESETPoolIndex=1 is associated with the PCID of the non-serving cell.

Preferably, the SSB configured for the PL-RS for PUSCH, PUCCH and SRS associated with CORESETPoolIndex=1 is associated with the PCID of the non-serving cell.

Preferably, the CSI-RS configured for the spatial relation for PUCCH and SRS associated with CORESETPoolIndex=1 is QCLed with a SSB from the non-serving cell.

Preferably, the CSI-RS configured for the PL-RS for PUSCH, PUCCH and SRS associated with CORESETPoolIndex=1 is QCLed with a SSB from the non-serving cell.

Preferably, the PCID of the non-serving cell is associated with a neighboring cell configured in the measurement objects for the UE.

Preferably, the SSB indices associated with the PCID of the non-serving cell are within the SMTC configured for the neighboring cell associated with the PCID.

Preferably, the SSB associated with the PCID of the non-serving cell has the same frequency and the same SCS as the SSB associated with the PCID of the serving cell.

Figure 5:
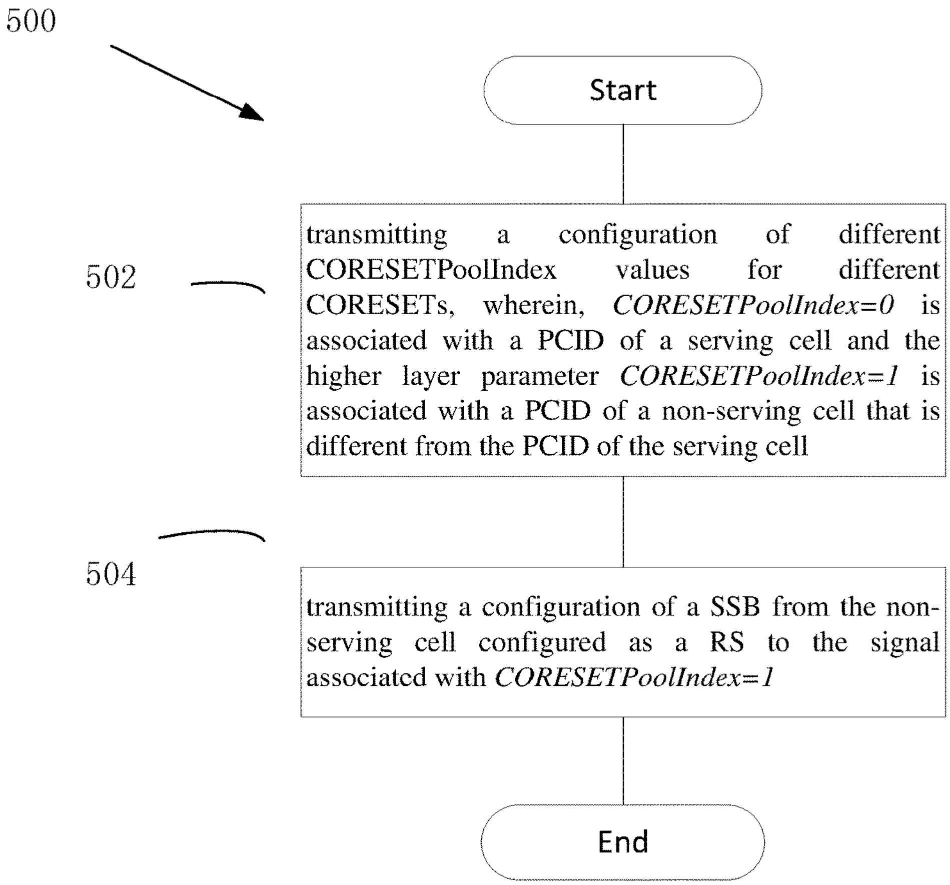
FIG. 5 is a schematic flow chart diagram illustrating a further embodiment of a method.

FIG. 5 is a schematic flow chart diagram illustrating an embodiment of a method 500 according to the present application. In some embodiments, the method 500 is performed by an apparatus, such as a base unit. In certain embodiments, the method 500 may be performed by a processor executing program code, for example, a microcontroller, a microprocessor, a CPU, a GPU, an auxiliary processing unit, a FPGA, or the like.

The method 500 may include 502 transmitting a configuration of different CORESETPoolIndex values for different CORESETs, wherein, CORESETPoolIndex=0 is associated with a PCID of a serving cell and the higher layer parameter CORESETPoolIndex=1 is associated with a PCID of a non-serving cell that is different from the PCID of the serving cell; and 504 transmitting a configuration of a SSB from the non-serving cell configured as a RS to the signal associated with CORESETPoolIndex=1.

Preferably, the TRS contained in the TCI state activated for the CORESET configured with CORESETPoolIndex=1 is QCLed with a SSB from the non-serving cell.

Preferably, the TRS contained in the activated TCI state associated with CORESETPoolIndex=1 used for PDSCH is QCLed with a SSB from the non-serving cell.

Preferably, the SSB configured for the spatial relation for PUCCH and SRS associated with CORESETPoolIndex=1 is associated with the PCID of the non-serving cell.

Preferably, the SSB configured for the PL-RS for PUSCH, PUCCH and SRS associated with CORESETPoolIndex=1 is associated with the PCID of the non-serving cell.

Preferably, the CSI-RS configured for the spatial relation for PUCCH and SRS associated with CORESETPoolIndex=1 is QCLed with a SSB from the non-serving cell.

Preferably, the CSI-RS configured for the PL-RS for PUSCH, PUCCH and SRS associated with CORESETPoolIndex=1 is QCLed with a SSB from the non-serving cell.

Preferably, the PCID of the non-serving cell is associated with a neighboring cell configured in the measurement objects for the UE.

Preferably, the SSB indices associated with the PCID of the non-serving cell are within the SMTC configured for the neighboring cell associated with the PCID.

Preferably, the SSB associated with the PCID of the non-serving cell has the same frequency and the same SCS as the SSB associated with the PCID of the serving cell.

Figure 6:
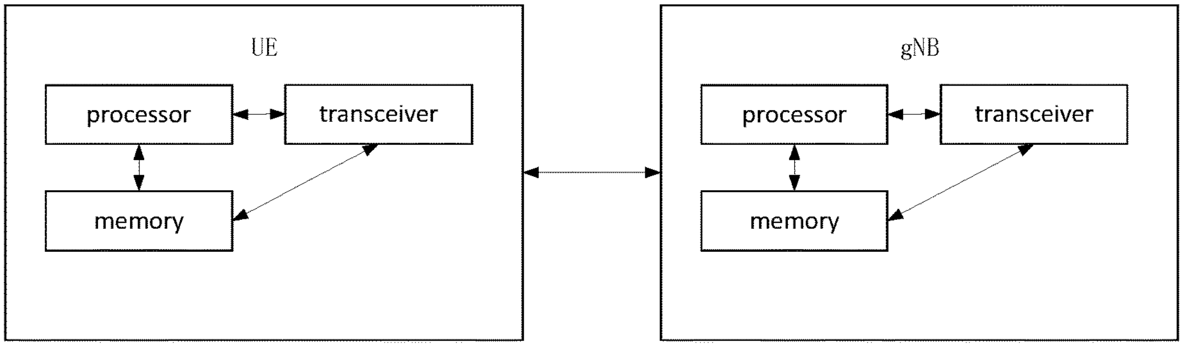
FIG. 6 is a schematic block diagram illustrating apparatuses according to one embodiment.

FIG. 6 is a schematic block diagram illustrating apparatuses according to one embodiment.

Referring to FIG. 6, the UE (i.e. the remote unit) includes a processor, a memory, and a transceiver. The processor implements a function, a process, and/or a method which are proposed in FIG. 4.

The remote unit comprises a receiver that receives a configuration of different CORESETPoolIndex values for different CORESETs, wherein, CORESETPoolIndex=0 is associated with a PCID of a serving cell and the higher layer parameter CORESETPoolIndex=1 is associated with a PCID of a non-serving cell that is different from the PCID of the serving cell, and further receives a configuration of a SSB from the non-serving cell configured as a RS to the signal associated with CORESETPoolIndex=1.

Preferably, the TRS contained in the TCI state activated for the CORESET configured with CORESETPoolIndex=1 is QCLed with a SSB from the non-serving cell.

Preferably, the TRS contained in the activated TCI state associated with CORESETPoolIndex=1 used for PDSCH is QCLed with a SSB from the non-serving cell.

Preferably, the SSB configured for the spatial relation for PUCCH and SRS associated with CORESETPoolIndex=1 is associated with the PCID of the non-serving cell.

Preferably, the SSB configured for the PL-RS for PUSCH, PUCCH and SRS associated with CORESETPoolIndex=1 is associated with the PCID of the non-serving cell.

Preferably, the CSI-RS configured for the spatial relation for PUCCH and SRS associated with CORESETPoolIndex=1 is QCLed with a SSB from the non-serving cell.

Preferably, the CSI-RS configured for the PL-RS for PUSCH, PUCCH and SRS associated with CORESETPoolIndex=1 is QCLed with a SSB from the non-serving cell.

Preferably, the PCID of the non-serving cell is associated with a neighboring cell configured in the measurement objects for the UE.

Preferably, the SSB indices associated with the PCID of the non-serving cell are within the SMTC configured for the neighboring cell associated with the PCID.

Preferably, the SSB associated with the PCID of the non-serving cell has the same frequency and the same SCS as the SSB associated with the PCID of the serving cell.

The gNB (i.e. base unit) includes a processor, a memory, and a transceiver. The processors implement a function, a process, and/or a method which are proposed in FIG. 5.

The base unit comprises a transmitter that transmits a configuration of different CORESETPoolIndex values for different CORESETs, wherein, CORESETPoolIndex=0 is associated with a PCID of a serving cell and the higher layer parameter CORESETPoolIndex=1 is associated with a PCID of a non-serving cell that is different from the PCID of the serving cell, and further transmits a configuration of a SSB from the non-serving cell configured as a RS to the signal associated with CORESETPoolIndex=1.

Preferably, the TRS contained in the TCI state activated for the CORESET configured with CORESETPoolIndex=1 is QCLed with a SSB from the non-serving cell.

Preferably, the TRS contained in the activated TCI state associated with CORESETPoolIndex=1 used for PDSCH is QCLed with a SSB from the non-serving cell.

Preferably, the SSB configured for the spatial relation for PUCCH and SRS associated with CORESETPoolIndex=1 is associated with the PCID of the non-serving cell.

Preferably, the SSB configured for the PL-RS for PUSCH, PUCCH and SRS associated with CORESETPoolIndex=1 is associated with the PCID of the non-serving cell.

Preferably, the CSI-RS configured for the spatial relation for PUCCH and SRS associated with CORESETPoolIndex=1 is QCLed with a SSB from the non-serving cell.

Preferably, the CSI-RS configured for the PL-RS for PUSCH, PUCCH and SRS associated with CORESETPoolIndex=1 is QCLed with a SSB from the non-serving cell.

Preferably, the PCID of the non-serving cell is associated with a neighboring cell configured in the measurement objects for the UE.

Preferably, the SSB indices associated with the PCID of the non-serving cell are within the SMTC configured for the neighboring cell associated with the PCID.

Preferably, the SSB associated with the PCID of the non-serving cell has the same frequency and the same SCS as the SSB associated with the PCID of the serving cell.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated in the appended claims rather than by the foregoing description. All changes which come within the meaning and range of equivalency of the claims are to be embraced within their scope.

What is claimed is:

1. A remote unit for wireless communication, comprising:

at least one memory; and at least one processor coupled with the at least one memory and configured to cause the remote unit to:

receive a configuration of different CORESETPoolIndex values for different control resource sets (CORESET), wherein CORESETPoolIndex=0 is associated with a physical cell identifier (PCID) of a serving cell and a higher layer parameter CORESETPoolIndex=1 is associated with a PCID of a non-serving cell that is different from the PCID of the serving cell; and receive, from the non-serving cell, a first synchronization signal block (SSB) associated with th ePCID of the non-serving cell, the first SSB from the non-serving cell configured as a reference signal (RS) to a signal associated with CORESETPoolIndex=1, and wherein the first SSB has a same frequency and a same subcarrier spacing (SCS) as a second SSB associated with the PCID of the serving cell..

2. The remote unit of claim 1, wherein a tracking reference signal (TRS) contained in a transmission control information (TCI) state activated for a CORESET configured with CORESETPoolIndex=1 is quasi co-located (QCLed) with the SSB from the non-serving cell.

3. The remote unit of claim 1, wherein a tracking reference signal (TRS) contained in an activated transmission control information (TCI) state associated CORESETPoolIndex=1 used for physical downlink shared channel (PDSCH) is quasi co-located (QCLed) with the SSB from the non-serving cell.

4. The remote unit of claim 1, wherein an SSB configured for a spatial relation for physical uplink control channel (PUCCH) and sounding reference signal (SRS) associated with CORESETPoolIndex=1 is associated with the PCID of the non-serving cell.

5. The remote unit of claim 1, wherein an SSB configured for pathloss reference signal (PL-RS) for physical uplink shared channel (PUSCH), physical uplink control channel (PUCCH) and sounding reference signal (SRS) associated with CORESETPoolIndex=1 is associated with the PCID of the non-serving cell.

6. The remote unit of claim 1, wherein a channel state information reference signal (CSI-RS) configured for a spatial relation for physical uplink control channel (PUCCH) and sounding reference signal (SRS) associated with CORESETPoolIndex=1 is quasi co-located (QCLed) with the SSB from the non-serving cell.

7. The remote unit of claim 1, wherein a channel state information reference signal (CSI-RS) configured for pathloss reference signal (PL-RS) for physical uplink shared channel (PUSCH), physical uplink control channel (PUCCH) and sounding reference signal (SRS) associated with CORESETPoolIndex=1 is quasi co-located (QCLed) with the SSB from the non-serving cell.

8. The remote unit of claim 1, wherein the PCID of the non-serving cell is associated with a neighboring cell configured in measurement objects for a user equipment (UE).

9. The remote unit of claim 1, wherein SSB indices associated with the PCID of the non-serving cell are within a synchronization signal physical broadcast channel (SS/PBCH) block measurement timing configuration (SMTC) configured for a neighboring cell associated with the PCID of the non-serving cell.

10. A base unit for wireless communication, comprising:

at least one memory; and at least one processor coupled with the at least one memory and configured to cause the base unit to:

transmit a configuration of different CORESETPoolIndex values for different control resource sets (CORESETS), wherein CORESETPoolIndex=0 is associated with a physical cell identifier (PCID) of a serving cell and a higher layer parameter CORESETPoolIndex=1 is associated with a PCID of a non-serving cell that is different from the PCID of the serving cell; and transmit, from the non-serving cell, a synchronization signal block (SSB) associated with the PCID of the non-serving cell, the first SSB from the non-serving cell configured as a reference signal (RS) to a signal associated with CORESETPoolIndex=1, and wherein the first SSB has a same frequency and a same subcarrier spacing (SCS) as a second SSB associated with the PCID of the serving cell.

11. The base unit of claim 10, wherein a tracking reference signal (TRS) contained in a transmission control information (TCI) state activated for a CORESET configured with CORESETPoolIndex=1 is quasi co-located (QCLed) with the SSB from the non-serving cell.

12. A method performed by a remote unit, the method comprising:

receiving a configuration of different CORESETPoolIndex values for different control resource sets (CORESET), wherein CORESETPoolIndex=0 is associated with a physical cell identifier (PCID) of a serving cell and a higher layer parameter CORESETPoolIndex=1 is associated with a PCID of a non-serving cell that is different from the PCID of the serving cell; and receiving a configuration of a synchronization signal block (SSB) from the non-serving cell configured as a reference signal (RS) to a signal associated with CORESETPoolIndex=1.

13. The method of claim 12, wherein a tracking reference signal (TRS) contained in a transmission control information (TCI) state activated for a CORESET configured with CORESETPoolIndex=1 is quasi co-located (QCLed) with the SSB from the non-serving cell.

14. The method of claim 12, wherein a tracking reference signal (TRS) contained in an activated transmission control information (TCI) state associated CORESETPoolIndex=1 used for physical downlink shared channel (PDSCH) is quasi co-located (QCLed) with the SSB from the non-serving cell.

15. The method of claim 12, wherein the SSB configured for a spatial relation for physical uplink control channel (PUCCH) and sounding reference signal (SRS) associated with CORESETPoolIndex=1 is associated with the PCID of the non-serving cell.

16. The method of claim 12, wherein the SSB configured for pathloss reference signal (PL-RS) for physical uplink shared channel (PUSCH), physical uplink control channel (PUCCH) and sounding reference signal (SRS) associated with CORESETPoolIndex=1 is associated with the PCID of the non-serving cell.

17. The method of claim 12, wherein a channel state information reference signal (CSI-RS) configured for a spatial relation for physical uplink control channel (PUCCH) and sounding reference signal (SRS) associated with CORESETPoolIndex=1 is quasi co-located (QCLed) with the SSB from the non-serving cell.

18. The method of claim 12, wherein a channel state information reference signal (CSI-RS) configured for pathloss reference signal (PL-RS) for physical uplink shared channel (PUSCH), physical uplink control channel (PUCCH) and sounding reference signal (SRS) associated with CORESETPoolIndex=1 is quasi co-located (QCLed) with the SSB from the non-serving cell.

19. The method of claim 12, wherein the PCID of the non-serving cell is associated with a neighboring cell configured in measurement objects for a user equipment (UE).

20. A method performed by a remote unit, the method comprising:

transmitting a configuration of different CORESETPoolIndex values for different control resource sets (CORESETS), wherein CORESETPoolIndex=0 is associated with a physical cell identifier (PCID) of a serving cell and a higher layer parameter CORESETPoolIndex=1 is associated with a PCID of a non-serving cell that is different from the PCID of the serving cell; and transmitting, from the non-serving cell, a synchronization signal block (SSB) associated with the PCID of the non-serving cell, the first SSB from the non-serving cell configured as a reference signal (RS) to a signal associated with CORESETPoolIndex=1, and wherein the first SSB has a same frequency and a same subcarrier spacing (SCS) as a second SSB associated with the PCID of the serving cell.

* * * * *